United States Patent [19]
Costello et al.

[11] Patent Number: 6,059,207
[45] Date of Patent: May 9, 2000

[54] PROCESS FOR RECOVERING HIGH VALUE POLYMER FROM CARPET SELVAGE WASTE

[75] Inventors: Michael Robert Costello, Richmond; Forrest Eugene Sloan, Chesterfield; Edward Aloysius Duffy, Richmond, all of Va.; Walter Michael Babb, Rocky Face; Allen Edens Ward, Dalton, both of Ga.

[73] Assignee: AlliedSignal Inc., Morristown, N.J.

[21] Appl. No.: 09/105,717

[22] Filed: Jun. 26, 1998

Related U.S. Application Data

[60] Provisional application No. 60/051,150, Jun. 27, 1997.

[51] Int. Cl.$^7$ .......................... B02C 19/00; B02C 19/12; B02C 23/08
[52] U.S. Cl. .................................. 241/24.12; 241/24.18; 241/29; 241/79.1; 241/157; 241/158; 241/186.4
[58] Field of Search .................... 241/4, 24.1, 24.12, 241/24.18, 27, 79.1, DIG. 38, 186.4, 154, 157, 158, 29

[56] References Cited

U.S. PATENT DOCUMENTS

| | | | |
|---|---|---|---|
| 3,843,060 | 10/1974 | Colburn | 241/24 |
| 4,028,159 | 6/1977 | Norris | 156/94 |
| 4,158,646 | 6/1979 | Benkowski et al. | 260/2.3 |
| 4,483,488 | 11/1984 | Luff et al. | 241/23 |
| 5,169,870 | 12/1992 | Corbin et al. | 521/49.8 |
| 5,230,473 | 7/1993 | Hagguist et al. | 241/3 |
| 5,233,021 | 8/1993 | Sikorski | 528/491 |
| 5,457,197 | 10/1995 | Sifiniades et al. | 540/540 |
| 5,497,949 | 3/1996 | Sharer | 241/76 |
| 5,518,188 | 5/1996 | Sharer | 241/14 |
| 5,535,945 | 7/1996 | Sferrazza et al. | 241/24.12 |
| 5,656,757 | 8/1997 | Jenczewski et al. | 540/540 |
| 5,681,952 | 10/1997 | Sifinaides et al. | 540/540 |
| 5,722,603 | 3/1998 | Costello et al. | 241/20 |

FOREIGN PATENT DOCUMENTS

| | | |
|---|---|---|
| 1349000 | 3/1974 | Brazil . |
| 681896 | 3/1995 | European Pat. Off. . |
| 3343711 | 6/1985 | Germany . |

*Primary Examiner*—John M. Husar
*Attorney, Agent, or Firm*—Melanie L. Brown; Virginia S. Andrews; Roger H. Criss

[57] ABSTRACT

The present invention provides an inexpensive process which can be placed in the carpet mill to add value to carpet selvage waste by segregating the various materials used to manufacture the selvage waste. The process for segregating at least one component of a carpet selvage waste comprises the steps of:

a. providing carpet selvage waste from carpet manufacturing comprised of tufts comprised of face fiber material, primary backing, an adhesive and optionally a secondary backing, b. identifying face fiber type used in the tufts in the carpet selvage, c. removing the face fiber from the carpet selvage such that the face fiber is essentially free of the primary backing and residual adhesive and d. segregating the removed face fiber from the remainder of the carpet selvage in a mechanical system which segregates fiber by fiber type to obtain a relatively pure stream of the face fiber.

All removed, segregated components may be recycled and/or reused.

25 Claims, 6 Drawing Sheets

PROCESS FOR RECOVERING HIGH VALUE POLYMER FROM CARPET SELVAGE WASTE

This application claims the priority date of provisional application Ser. No. 60/051,150, filed Jun. 27, 1997.

FIELD OF THE INVENTION

The present invention relates to a process for segregation and recovery of components of carpet selvage waste. More specifically, the present invention relates to processes whereby a substantial portion of the components of carpet selvage may be segregated from each other mechanically and physically so that they may be recycled.

BACKGROUND OF THE INVENTION

Carpet is typically comprised of fiber tufts, a primary backing, an adhesive material, and optionally, a secondary backing. In the usual mode of manufacturing carpet, the fiber tufts are tufted through a woven or non-woven fabric which is the primary backing. The part of the tufts on the exposed surface of the carpet comprises face fiber. A latex-based adhesive is applied to the back of the tufted structure to lock in the tufts. Next a woven secondary backing is attached to the back of the primary backing to give the carpet added dimensional stability as well as to provide for additional tuft bind.

Usually the very edges of this structure have no fiber tufted through the primary backing for a width of typically about 1.75 to 4.5 inches. These edges are parallel to the machine direction of the carpet manufacturing process and are used to guide the carpet through the machinery by means of tentor pins in the machinery which pierce the edge of the carpet and hold it under tension. As a final step in carpet manufacturing and prior to rolling up the carpet for sale, these two, 2 parallel edges, having served their purpose, are trimmed from the carpet, producing carpet selvage waste. Such selvage waste is typically about 3 to 6 inches in width and has a small portion of tufts, typically about 1.25 to 4.25 inches in width, at one edge. The selvage waste is typically baled and sent to a landfill.

Carpet selvage waste has long been acknowledged in the carpet manufacturing industry as a serious waste issue. Because the carpet industry is concentrated in north west Georgia, most of the selvage waste produced in North America goes to one landfill, the Dalton-Whitfield County landfill. This landfill currently accepts about 50,000 tons of post-consumer selvage waste from carpet mills each year. In fact, the Dalton-Whitfield County landfill accepts so much selvage waste that they have actually devoted a special section of the landfill to dispose of this waste.

Several years ago, Waste Conversion Systems of Georgia proposed a plan to build a waste-to-energy plant in Calhoun, Georgia to deal with the problem. The plant was built, however the plan ultimately ended in an environmental tragedy when the plant and 1.5 acres of carpet selvage waste caught on fire. About 250 people were evacuated from their homes because of the resultant smoke. It took more than a week to fully extinguish the flames of this fire.

Carpet selvage itself has little or no value as a composite. Its disposal costs the carpet mills about $30/ton. Carpet selvage is however made of valuable materials. The primary and secondary backings are usually polypropylene, the fiber tufts are usually nylon 6, nylon 66, polypropylene, or polyester, while the remaining material in the selvage is mostly calcium carbonate and styrene-butadiene-rubber (SBR) latex. The value of these materials is realized only when they are segregated from one another and available for reuse.

Surprisingly, little work has been done to recover value from the carpet selvage waste stream. In U.S. Pat. No. 4,028,159 a process directed to carpet selvage is taught wherein selvage is heated to produce a mixture of meltable resins which is separated from any solid residue and then used in the adhesive mixture in subsequent carpet manufacture. This melt filtration process produces recovered polymer which has been significantly degraded, adversely impacting the recovered polymers' physical properties. This process would also produce air emissions with high organic content. Finally, while the resulting mixed resin may be used in carpets with hot melt adhesive backings, it is not useful in a typical SBR latex-backed carpet, and the mixed resin has little value if sold on the waste market.

There is a modestly larger body of art dealing with the recycling of whole carpets, whole carpet being carpet which has not been subjected to any mechanical segregation. There are two general categories of methods for reclamation of whole carpets, including carpet scraps. One category includes multiple mechanical steps including shredding, grinding and other means of overall size reduction followed by air elutriation and/or hydrocyclone segregation and/or screening and/or beating to effect segregation of the different components of the carpet waste. This category is exemplified by U.S. Pat. Nos. 5,230,473, 5,535,945, 5,497,949, 5,518,188, commonly-assigned U.S. Pat. No. 5,722,603, BP 1,349,000, and DE 3,343,788 A1. A common problem with these processes is that the stream of segregated carpet tufts is contaminated with residual latex and/or primary backing materials. Furthermore, none provide for the automated identification of the face fiber type as part of the process or reclamation. In addition, in the instance of U.S. Pat. No. 5,230,473, carpet selvage is too narrow for the application of the brushes described in the patent. DE 0,681,896 A1 teaches a process to recover highly pure fiber tufts and backing materials from broadloom carpet by first grinding the carpet then using a series of centrifuges to segregate the materials based on specific gravity. While this technique is technically feasible for use on carpet selvage waste, it would be too costly to install such a system at each carpet mill.

A second category of processes in whole carpet reclamation include depolymerization as a means of segregation from mixed components after various mechanical steps. U.S. Pat. No. 5,169,870, and commonly-assigned patents U.S. Pat. Nos. 5,656,757, 5,457,197 and 5,681,952 exemplify the use of a depolymerization step in whole carpet reclamation. Generally these methods would be impractical and expensive for use in carpet mills to use on carpet selvage. Furthermore, none provide for the automated identification of the face fiber type as part of the process or reclamation.

Therefore there exists a need for an inexpensive system to recover each component of carpet selvage in a relatively pure stream which would allow the carpet mills to avoid or reduce the disposal fees associated with carpet selvage. Furthermore, they could generate significant revenue from the sale of these segregated materials.

SUMMARY OF THE INVENTION

We have developed a process which responds to the foregoing need in the art. The present invention provides an inexpensive process which can be placed in the carpet mill to add value to the selvage waste by segregating the various materials used to manufacture the selvage waste. The process for segregating at least one component of a carpet selvage waste comprises the steps of:
 a. providing carpet selvage waste from carpet manufacturing comprised of tufts comprised of face fiber material, primary backing, an adhesive and optionally a secondary backing,
 b. identifying face fiber type used in the tufts in the carpet selvage,
 c. removing the face fiber from the carpet selvage such that the face fiber is essentially free of the primary backing and residual adhesive and
 d. segregating the removed face fiber from the remainder of the carpet selvage in a mechanical system which segregates fiber by fiber type to obtain a relatively pure stream of the face fiber.

The current invention further provides a process comprising the steps of:
 a. providing carpet selvage waste from carpet manufacturing comprised of tufts, primary backing, an adhesive and optionally a secondary backing,
 b. identifying the face fiber type used in the tufts on the carpet selvage,
 c. removing and segregating the secondary backing from the carpet selvage to obtain a relatively pure stream of the secondary backing,
 d. removing the face fiber off the primary backing such that the face fiber is essentially free of the primary backing and residual adhesive,
 e. segregating the removed face fiber in a mechanical system which segregates fiber by fiber type to obtain a relatively pure stream of the face fiber,
 f. removing the edge of the primary backing which does not contain the face fiber, and segregating it to obtain a relatively pure stream of the primary backing,
 g. collecting the relatively pure streams of material in separate bins and,
 h. baling, pelletizing or agglomerating the relatively pure material streams.

The current invention further provides an apparatus for removing and segregating fiber from a composite of the fiber and a non-fibrous backing comprising:
 a. a rotating element for transporting the composite,
 b. a series of at least four beveling heads for removing the fiber wherein the beveling heads are in close proximity to the rotating element and each the beveling head comprises a rotating cutting device and a stationary cutting device and
 c. a means for removing and segregating the cut fiber from the remainder of the composite.

The present invention is advantageous because it provides an inexpensive method of recovering high value face fiber and other high value components from carpet waste selvage for additional recycle and/or reuse.

Other advantages of the present invention will be apparent from the following description, attached drawings, and attached claims.

DETAILED DESCRIPTION OF THE PREFERRED EMBODIMENTS

Figure 1:
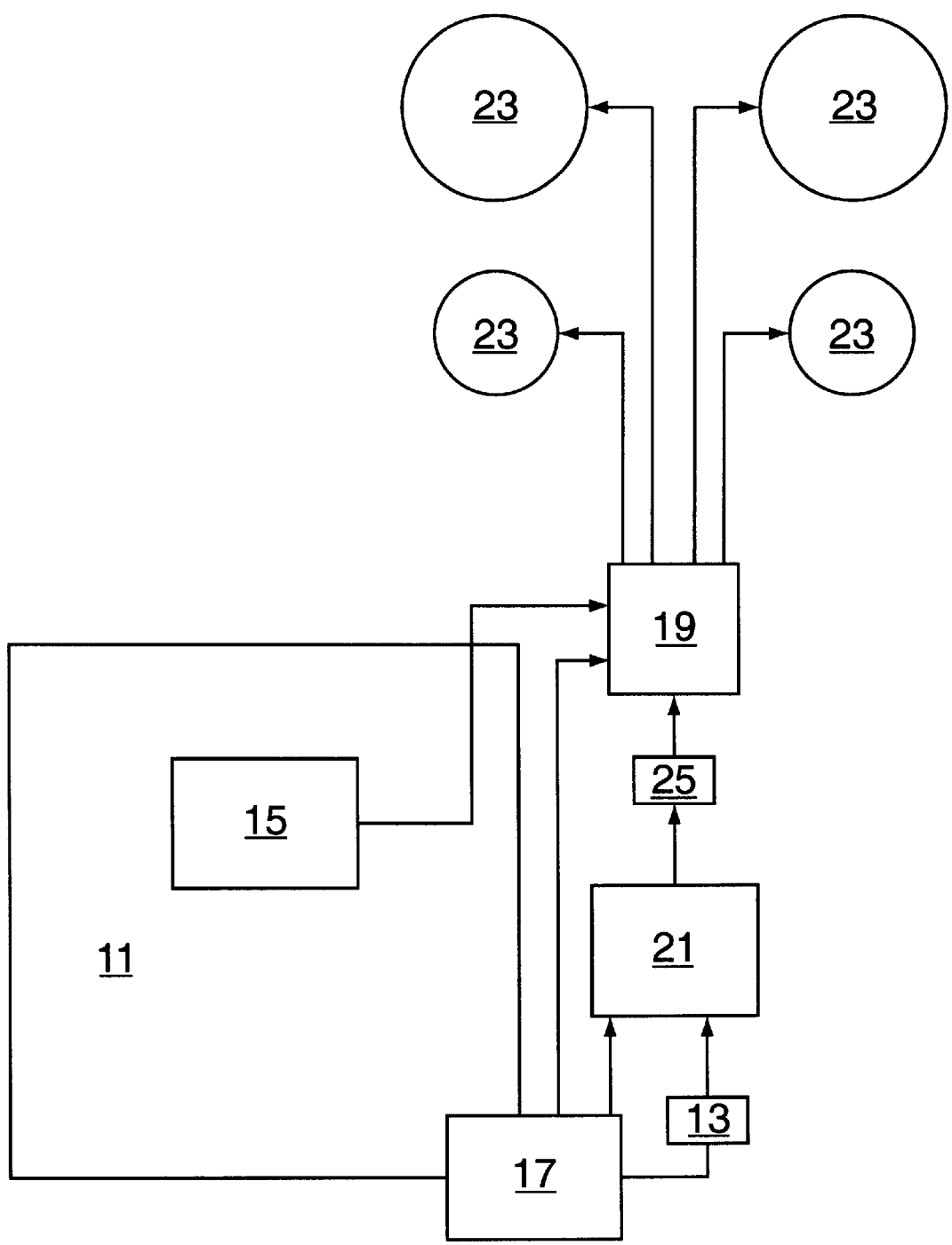
FIG. 1 illustrates a system to segregate selvage by face fiber type.

As used herein, "selvage waste" denotes carpet selvage which has been trimmed from the carpet during the manufacturing process, but which has not yet been subject to any mechanical or chemical segregation process.

As used herein, "segregate" denotes the action of physically separating, physically isolating, physically withdrawing and/or physically setting apart of one carpet selvage component from the remainder of carpet selvage components.

As used herein, "tufts" denotes the carpet fiber in its entirety which is tufted through a supportive scrim, and includes the face fiber, the portion of the carpet fiber which traverses the primary backing and the portion of the carpet fiber which is at the back of the primary backing, is bonded by adhesive and, in the instance of a secondary backing, is sandwiched between the primary and secondary backings.

As used herein, "face fiber" denotes the portion of the tufts which is on the front or exposed surface of the carpet during the carpet's useful life. Face fiber is not contacted by the adhesive on the back of the primary backing. Selvage waste usually contains some amount of tufts and therefore face fiber along one of its edges. This fiber could be nylon 6, commercially available for example from AlliedSignal, Inc., nylon 66, polypropylene, polyester, wool, cotton, acrylic, as well as other fiber types used for this purpose.

As used herein, "cut pile" denotes a type of face fiber which does not form a loop on the exposed surface of the carpet. A carpet having such face fiber is called "cut pile carpet".

As used herein, "pile height" denotes the height of face fiber on a carpet.

As used herein, the phrase "removing face fiber" excludes the rotating mechanical impingement devices of U.S. Pat. No. 5,230,473 and the rotating impact resistant carriers of DE 3,343,788.

As used herein, the phrase "relatively pure stream of face fiber" denotes a stream of at least about 90% face fiber and less than about 10% impurities comprised of fiber finishes, dyes and other additives.

As used herein, "backing materials" denotes a composite structure comprised of primary backing, adhesive material, secondary backing and the tufts which remains after face fiber is removed by shaving, shearing or skiving operations.

As used herein, "primary backing" denotes the supportive scrim through which the tufts are tufted. This primary backing is usually polypropylene; however, other materials such as polyester may also be used.

As used herein, the phrase "relatively pure stream of primary backing" denotes a stream of at least about 85% primary backing and less than about 10% impurities comprised of compounded latex and minor amounts of pigments.

As used herein, "latex" denotes carboxylic-styrene-butadiene rubber, styrene-butadiene rubber (SBR), natural rubber latex, or any other natural or synthetic rubber. Latex is commonly employed as an adhesive for holding tufts to the carpet backing.

As used herein, "compounded latex" denotes a latex and any additives or fillers in the latex. Examples of additives include aluminum trihydrate, flame retardants, foaming agents, frothing agents, water softeners, dispersing agents, thickeners, defoamers, pigments, anti-microbial agents, stain-resistant chemistries, as well as others. Common fillers in compounded latex include calcium carbonate and polyethylene.

As used herein, "adhesive material" denotes material functioning as an adhesive to bind tufts with backing. Adhesive material includes compounded latex, as mentioned above.

As used herein, "secondary backing" denotes a fabric which is adhered to the back of the selvage waste, behind the primary backing and sandwiching therein the back of the tufts, with an adhesive material such as compounded latex. The secondary backing is usually a fabric, typically made of polypropylene, however other backing types, such as jute, can be used.

As used herein, the phrase "relatively pure stream of secondary backing" denotes a stream of at least about 85% secondary backing and less than about 15% impurities comprised of latex.

As used herein, "Carpet Component Identification Code" or "CCIC" denotes an eight digit alpha code which was designed by the Carpet & Rug Institute to identify post-consumer carpets at the end of their useful life. This eight position alpha code is either printed directly on the visible side of the secondary backing or on a bar code sticker which is attached to the secondary backing at regular intervals during the course of manufacturing carpet. The first of the eight positions contains information regarding the face fiber type. Table 1 lists CCIC designations for various face fiber types.

TABLE 1

| Letter | Face Fiber Type |
|--------|-----------------|
| A | Nylon 6 |
| B | Nylon 66 - Staple |
| C | Nylon 66 - BCF |
| D | Polypropylene |
| E | Modified Polypropylene |
| F | Polyester |
| G | Modified Polyester |
| H | Nylon 6/Nylon 66 |
| I | Nylon 66/Polypropylene |
| J | Nylon 66/Polyester |
| K | Nylon 66/Wool |
| L | Nylon 6/Polypropylene |
| M | Nylon 6/Polyester |
| O | Nylon 6/Wool |
| P | Natural Fiber |
| Q | Acrylic |
| R | Other |
| X | Not identified |

FIG. 1 shows a system which could be used to segregate the selvage waste by face fiber type as that selvage waste is produced in carpet manufacturing. It is envisioned that this system can be employed concomitantly with carpet manufacture and processing and is physically adjacent to carpet lines in carpet manufacturing plants. As described below, several components of this system are in current use in most carpet mills and thus reduces the cost of practicing the instant invention. Preferably, as a first step in this process, the identification of the face fiber used in carpet 11, from which selvage waste 13 is derived, will occur.

The face fiber identification can be accomplished in one of several ways. A preferred embodiment of this invention includes the use of the Carpet Component Identification Code (CCIC). The CCIC system in carpet manufacture uses a computer which has the information about the current style running on the carpet finishing line to apply the corresponding code to the back of the secondary backing. Since the CCIC computer contains the information about the current style running on the carpet finishing line, it requires only a simple program modification to link this information to the diverter valves 19. Alternatively, a Near-Infrared (NIR) device, such as that taught in DE 1 9601923 and publication PCT/NL96/00280, could be placed over the face of the carpet to identify the fiber type being run. This NIR device would take a measurement at each style change and determine the face fiber type.

The information from face fiber identification system 15 and from metal detector 17 is used to coordinate and control diverter valves 19 to segregate the various face fiber types used in carpet manufacture. Carpet mills typically run multiple styles of carpet on a finishing line. Changes in style include, for example, face fiber type changes, color changes and tufting pattern changes. A small piece of metal placed on the edge of the carpet, which is detected by a metal detector, is typically used to indicate a change in style in the carpet on the finishing line. The information from such a metal detector 17 can also be used in the instant invention to signal the computer controlling a guillotine 21 that a style change in carpet 11 is approaching the guillotine 21. Guillotine 21 then cuts across the width of the selvage waste 13 at the junction between the two styles. The information from the face fiber identification system 15 determines which diverter valves 19 open and close, while the information from the metal detector 1 7 determines the timing of the changes so the valve to the appropriate fiber face type selvage waste bin 23 is opened at the appropriate time. The diverter valves 19 are internal to pneumatic conveyor 25 which carries the selvage waste 13 away from the guillotine 21, and deposits it in the correct selvage waste storage bin 23. There can be a separate bin for each kind of selvage waste based on the face fiber types. For practical purposes, a separate bin for nylon 6, nylon 66, and polyester with a fourth bin for other mixed fiber types would be sufficient for typical carpet selvage waste.

Simply segregating the carpet selvage waste by face fiber type adds significant value to this waste, because the segregated carpet selvage waste can then be recycled using more conventional recycling techniques such as depolymerization in the case of nylon 6 or mechanical segregation such as taught in EP 0,681,896 A1. In addition, another preferred embodiment is a more complete system which provides for the mechanical segregation of the various components of the selvage waste in order to add additional value to selvage waste. Individual aspects of this embodiment are now provided followed by the integration of these aspects into a complete system.

In the case of broadloom carpet, compounded latex is applied over the entire usable width of the tufts on the back of the primary backing, making removal of the secondary backing from broadloom whole carpet difficult. This difficulty does not exist for the carpet selvage waste because the compounded latex is not applied over the entire width of the selvage. Therefore it is significantly easier to remove the secondary backing from selvage waste than from whole carpet itself. A stream of relatively pure polypropylene is created thereby. Furthermore, the remaining primary backing and tufts composite has a higher proportion of face fiber content, resulting in increased value for both primary backing and face fiber streams.

Figure 2:
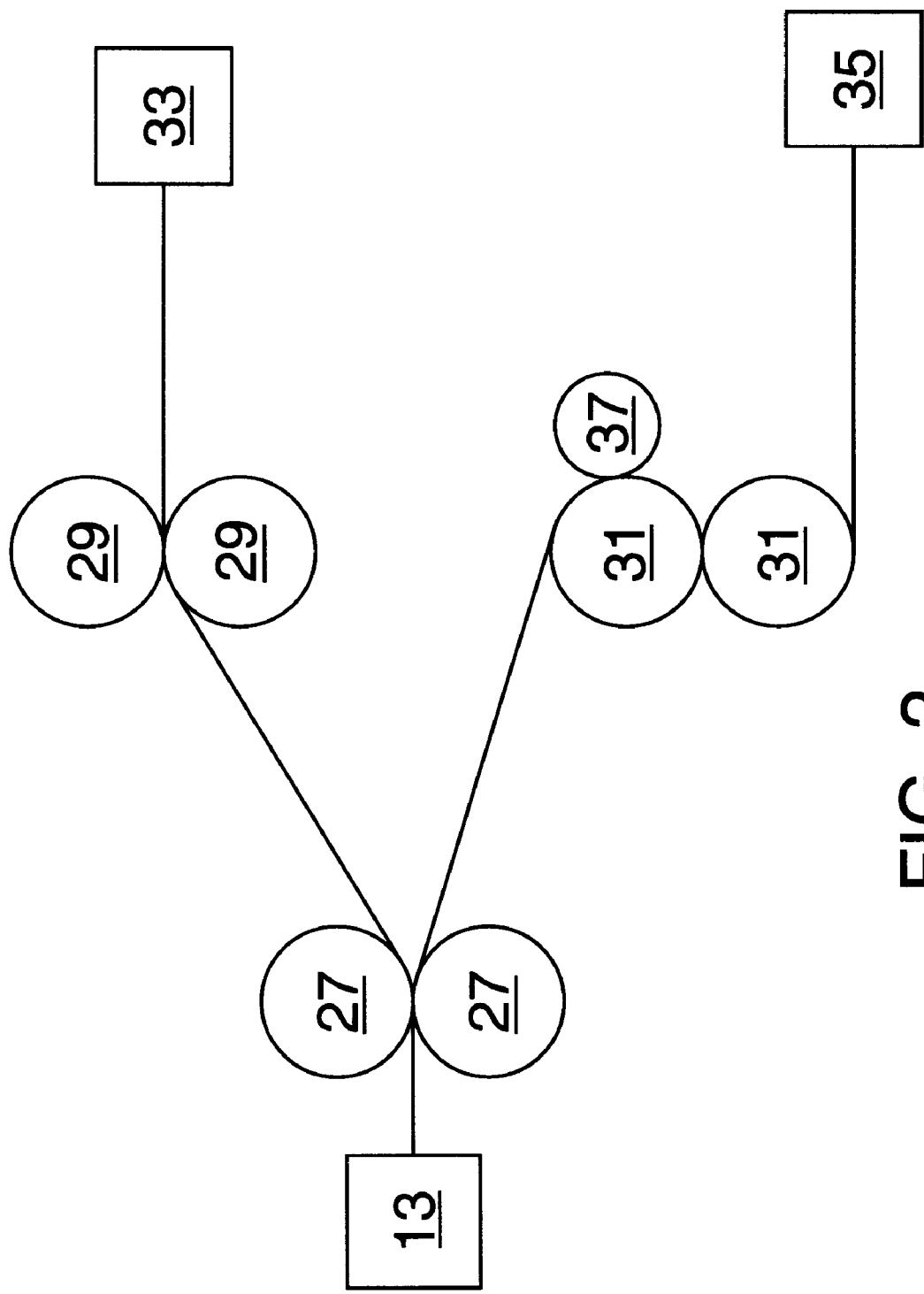
FIG. 2 illustrates a roller system possibly useful in removing secondary backing from carpet selvage.

Preferably, the secondary backing is removed, segregated from the carpet selvage to obtain a relatively pure stream of secondary backing. FIG. 2 illustrates a system which could be used to remove the secondary backing from selvage waste. In this system the selvage waste 13 is passed through a set of primary nip rolls 27. The secondary nip rolls 29 and the third nip rolls 31 pull the primary backing and face fiber composite 33 away from the secondary backing 35. A cleaning brush 37 can be added to brush off any residual latex or face fiber which may still adhere to the secondary backing. This brush 37 should rotate slowly in a direction counter current to the direction in which the secondary backing is moving. The secondary backing 35 can then be collected and either baled, pelletized or agglomerated for recycling. Separately, the primary backing and face fiber composite 33 can be either collected for recycling or sent through additional segregation steps for further value enhancement.

Figure 3:
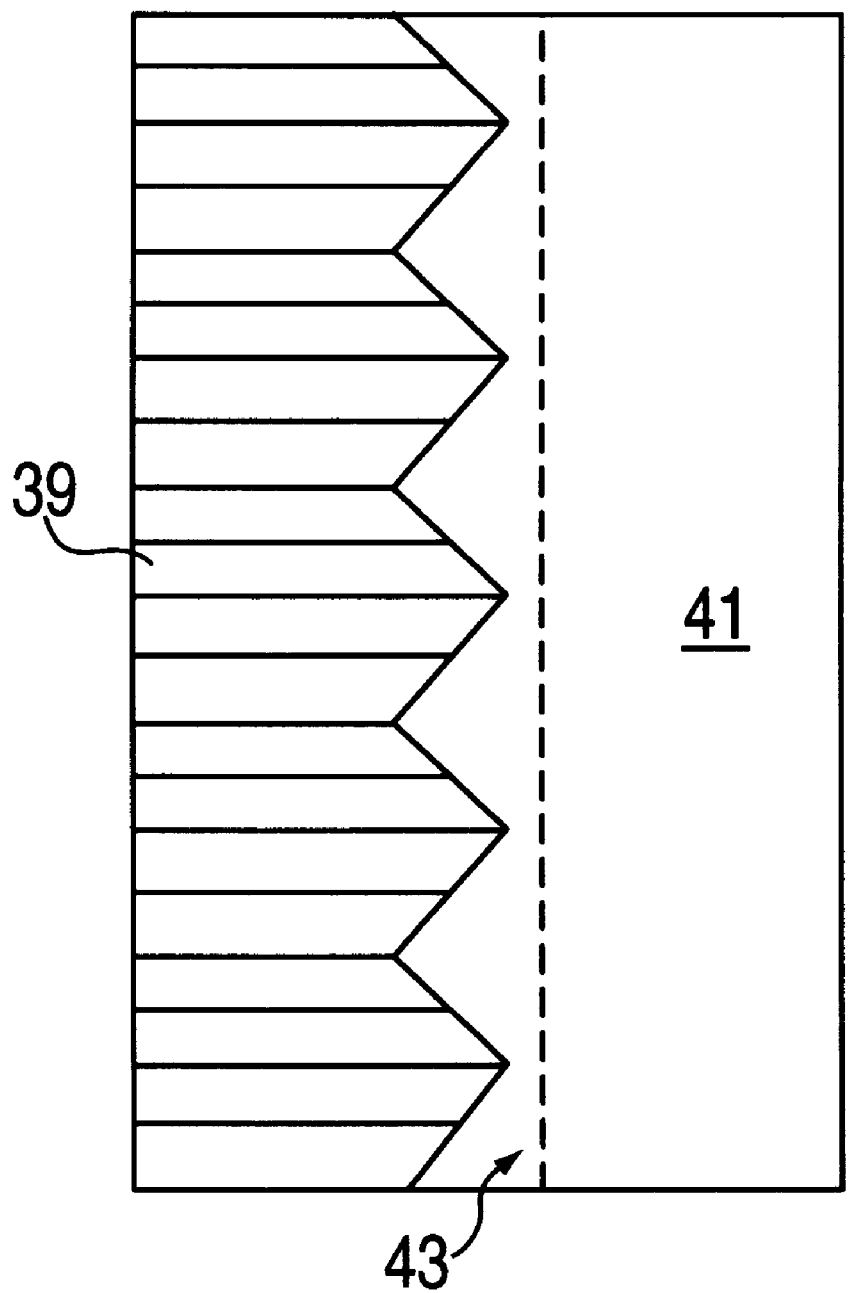
FIG. 3 is a schematic representation of carpet selvage from the top.

Another preferred embodiment of this invention is the generation of a relatively pure stream of primary backing. This step can be carried out either by itself, before removing the secondary backing, or after removing the secondary backing as previously described. Preferably, the removal of the primary backing is done before removing the secondary backing. FIG. 3 is a schematic view of selvage waste from the top. One longitudinal portion 39, which is generally about 1.25 to about 4.25 inches in width, contains tufts of which the face fiber is visible from the top. The remaining longitudinal portion 41 is primary backing. A longitudinal slit 43 is made through the selvage waste in the longitudinal direction such that face fiber remains entirely on one side of the resulting two pieces. The other resulting portion 41 of trim is substantially all primary backing, which is most typically polypropylene. The relatively pure polypropylene stream is collected separately from the remaining portion 39 which contains tufts. This polypropylene stream can be baled, pelletized, or agglomerated for recycling.

The formation of slit 43 may be accomplished in a number of ways. A preferred embodiment is to include a second set of slitting devices identical to, and in parallel with, those devices typically used in industrial carpet mills to cut the selvage off the carpet. An example of a useful slitting device is a circular rotary cutting blade. Alternatively, this slitting operation could be carried out using a hot wire or hot air to slit the selvage waste. This embodiment, however, creates a safety issue related to the possibility of burns, and a health issue related to the resulting smoke. Also the hot wire would require frequent and regular cleaning.

Figure 4:
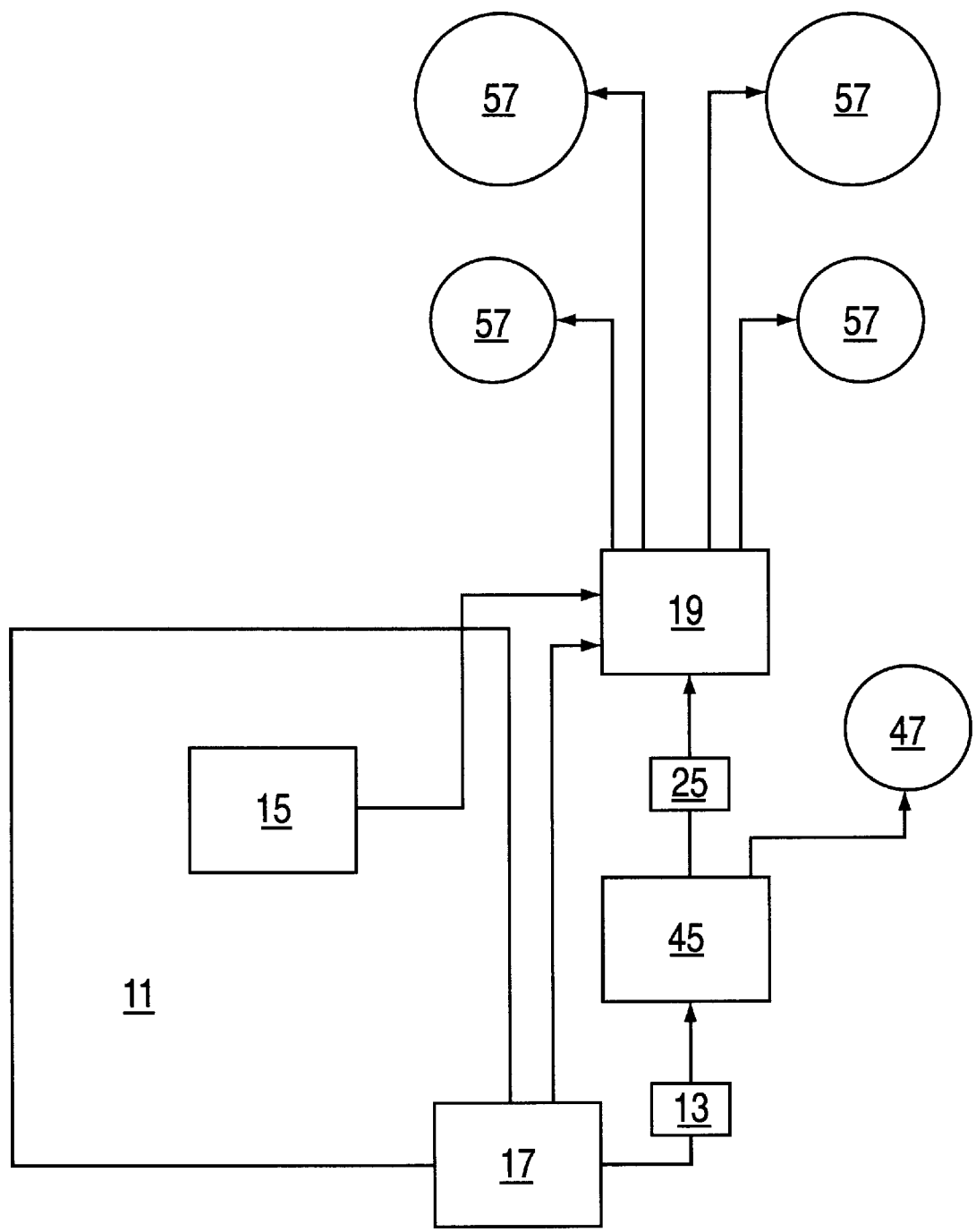
FIG. 4 illustrates a system for removing and segregating the face fiber off from the remainder of the carpet selvage.

Another preferable way to upgrade the value of carpet selvage waste is to remove and segregate the face fiber from the primary backing to generate a stream of relatively pure face fiber. Shaving the face fiber off the primary backing serves to generate a highly pure stream of fiber material since the adhesive material which contacts the tufts on the back of the primary backing is thereby segregated. FIG. 4 shows a system to shave the face fiber off the primary backing. This system is very similar to that shown in FIG. 1 with three key differences. The first two differences are that face fiber shearing equipment 45 replaces guillotine 21 and that backing materials composite 47 is either collected separately for recycling as a composite or are fed into further processing to recover relatively pure secondary backing as described previously. The third difference is that pneumatic conveyor 25 with its internal diverter valves 19 convey and segregate the removed face fiber to face fiber storage bins 57. The resultant removed and segregated face fiber can be recycled, for instance using depolymerization methods as taught in commonly-assigned U.S. Pat. No. 5,656,757, 5,457,197 and 5,681,952.

One preferred embodiment of the face fiber shearing equipment 45 is to use band knife equipment, which is available from the leather industry and is typically used for splitting leather, to shave the face fiber off the primary backing. This embodiment is especially preferred in application to selvage waste from cut pile carpet. An alternative embodiment is to shear the face fiber using a series of carpet beveling heads as shown in example 2 below or a reciprocating shear, such as those uses to shear sheep. However, a reciprocating shear requires more maintenance; the blades must be kept sharp, and they must be well oiled.

Figure 5:
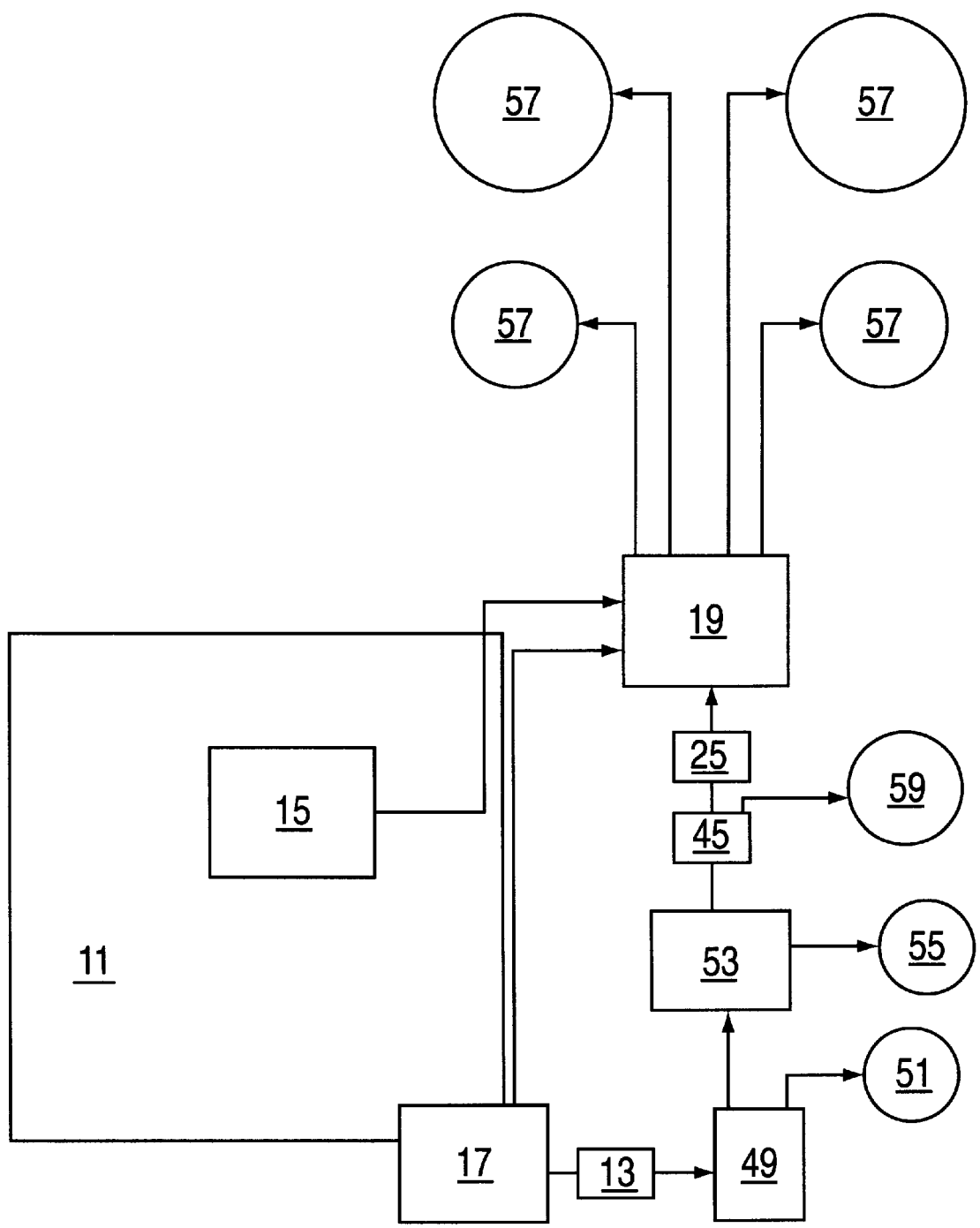
FIG. 5 illustrates an integrated system for carpet selvage waste segregation and recovery.

Integration of the aforementioned embodiments serves to enhance more fully the value of selvage waste. FIG. 5 illustrates such an integrated selvage waste recovery system. In this system, a double selvage slitting device 49 is made by adding an identical slitting device to the device typically used to remove carpet selvage from the carpet. The identical slitting device, added in parallel, is used to remove the primary backing portion from selvage waste 13 at about the same time the selvage itself is being trimmed off the completed carpet. This stream of relatively pure primary backing is segregated and collected in a bin 51. To remove the secondary backing from the remaining composite, the remaining composite, comprised of primary backing, tufts, adhesive and secondary backing, is delivered to a series of nip rollers 53. The removed and segregated secondary backing is then collected in a bin 55. The remaining selvage waste composite comprised of tufts, primary backing and adhesive is delivered to the face fiber shearing equipment 45 to remove the face fiber. The resultant relatively pure stream of face fiber is segregated and delivered by pneumatic conveyor 25 through diverter valves 19, internal to pneumatic conveyor 25, to the face fiber storage bin 57 corresponding to the face fiber type. The opening and closing of the diverter valves 19 are controlled by input from both the metal detector 17 and the face fiber identification system 15. The remaining waste composite comprised of primary backing, residual tufts and residual adhesive is delivered into a separate bin 59.

This integrated system thus generates a primary backing stream, a secondary backing stream, pure face fiber streams separated by type of polymer used in the carpet tufts and a mixed composite waste stream.

Relatively pure streams of nylon 6, nylon 66 and polypropylene have significant value and can be sold for between $0.05 and $0.30 per pound. Relatively pure streams of nylon 6 can, for instance, be reused, depolymerized and/or melted for use in engineering resin applications. A relatively pure stream of nylon 66, for instance, can be melted and used in engineering resin applications. A relatively pure stream of polypropylene can, for instance, be melted down and used in molding application or ground and sold as fiber waste, useful for concrete reinforcement or felt products. The remaining streams may either be disposed of or sold as mixed fiber waste with little value.

The integrated system as well as any of the individual embodiments can be applied to cut pile carpet as well as continuous loop carpet. The preferred type is a carpet selvage having polyamide cut pile tufts, polypropylene as both the primary and secondary backings, and SBR-latex adhesive.

EXAMPLE 1

Four samples of selvage waste were processed through a series of steps to simulate a system similar to that described in FIG. 5. Samples ranged in length from 44 inches to 68.5 inches. Sample 1 was 5 inches wide, sample 2 was 4 inches wide, sample 3 was 3.75 inches wide and sample 4 was 6 inches wide. The following steps were performed on each sample individually. First the selvage sample was weighed. Next, the face fiber was shaved off the selvage using a Sunbeam reciprocating shear. This face fiber was recovered and weighed. Next, the secondary backing was separated from the primary backing by pulling the two fabrics apart manually. It was observed that because the face fiber was shaved off prior to separating the secondary from the primary backing, an excessive amount of latex, and some face fiber, stuck to the secondary backing. To minimize this contamination in the secondary backing stream, it is therefore preferable to segregate the backings prior to removing the face fiber. The secondary backing was collected and weighed. Finally, the portion of the remaining composite which was the primary backing containing no tufts or residual face fiber was cut away from the other portion. This primary backing, essentially pure polypropylene, was collected and weighed. The results of this experiment are shown in Table 2. The weight percent recovery of each component was calculated as a function of the starting sample weight. Total recovery is the sum of the weight percentages of the three segregated recovered components.

TABLE 2

| Sample | Recovered Face Fiber | Recovered Secondary Backing | Recovered Primary Backing | Total Recovery |
|---|---|---|---|---|
| 1 | 38.2% | 31.9% | 5.6% | 75.7% |
| 2 | 27.5% | 42.0% | 6.8% | 76.3% |
| 3 | 41.2% | 27.2% | 4.6% | 73.0% |
| 4 | 19.6% | 46.7% | 6.4% | 72.7% |
| Average | 31.62% | 36.95% | 5.85% | 74.43% |

All the samples used in this experiment had relatively high face weights.

EXAMPLE 2

An alternate device for face fiber shearing which employed multiple carpet beveling heads was designed and built. Carpet beveling heads are typically used individually to trim the edges of carpets to be used as area rugs. The beveling heads are not typically used to shave large amounts of face fiber off carpets nor are they typically used as a group. They work by using a rotary knife encased inside of a small box and this knife cuts against a stationary knife. A vacuum hose is typically attached to the small box to withdraw the shaved face fiber from the box. Each beveling head is powered separately by a small electric motor.

Figure 6:
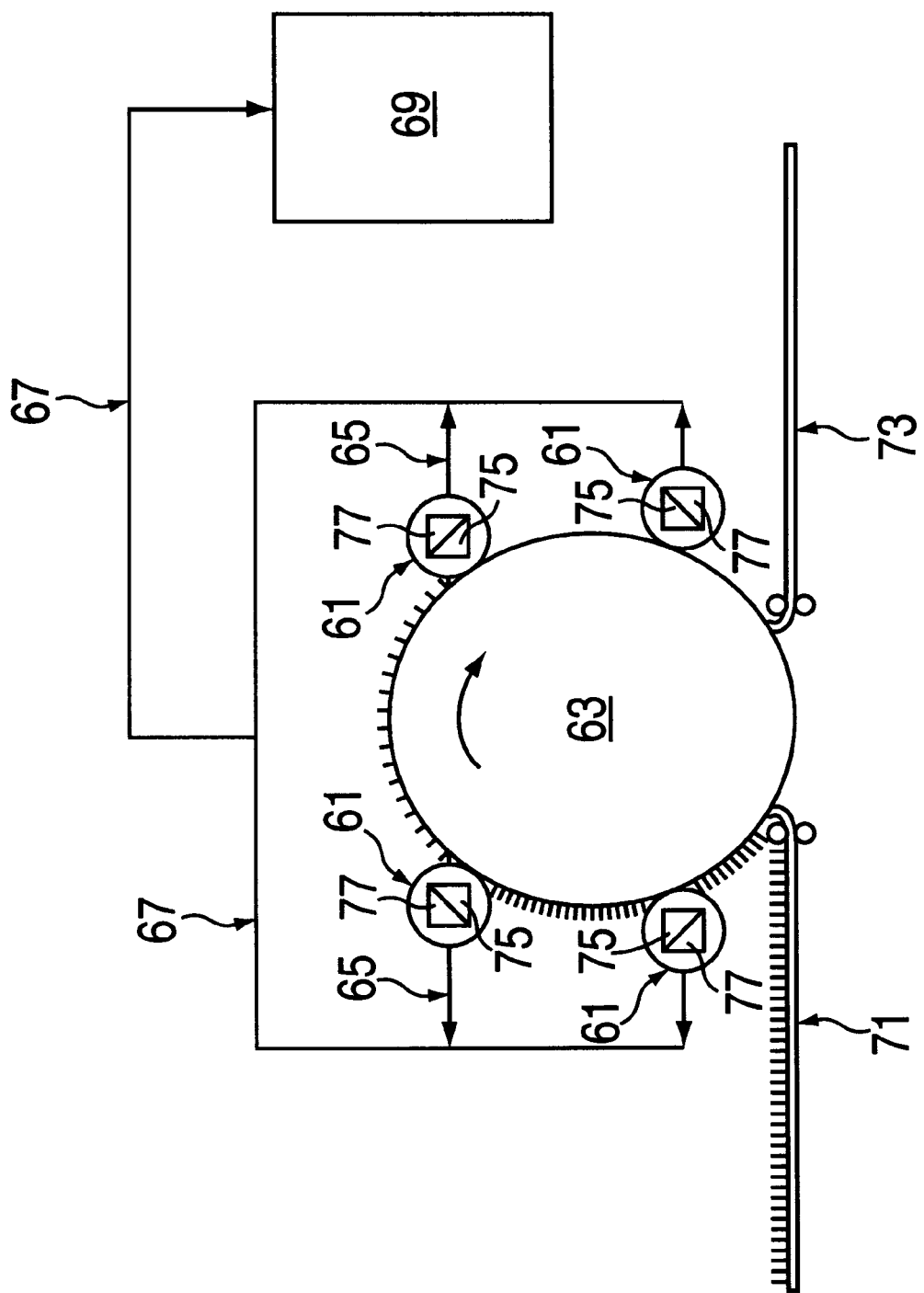
FIG. 6 illustrates a device possibly useful in removing and segregating face fiber from the remainder of the carpet selvage.

As illustrated in FIG. 6, a device was constructed for this trial. Four B & J beveling heads 61, containing rotating cutting device 75 and stationary cutting device 77, were situated at equal intervals adjacent to drum 63 which was approximately 12 inches in width and approximately 18 inches in diameter. The drum 63 was rotated by attaching a drive chain (not shown) to it and to a motor (not shown). Selvage waste 71 was conveyed by a series of tensioned guide rollers (not shown) to rotating drum 63. While residing against rotating drum 63, moving selvage waste 71 was contacted by each beveling head 61 consecutively, yielding removed face fiber and a sheared selvage waste composite 73. The removed face fiber was pneumatically conveyed from beveling heads 61 through individual vacuum lines 65 to common vacuum line 67 and into face fiber storage bin 69.

The device shown in FIG. 6 was installed in an industrial carpet manufacturing plant, adjacent to a carpet backing finishing line. Two trials were performed with this face fiber shearing device. The trials were performed on two different styles of nylon 66 carpet selvage. Sample 5 was selvage waste from a 25 ounce per square yard carpet having a 14/32 inch pile height. Sample 6 was selvage waste from a 45 ounce per square yard carpet having a 16/32 inch pile height. A portion of sample 5 was removed then the remainder was conveyed through the series of beveling heads at 105 feet per minute to match the line speed of the carpet back coating line on which the carpet was being run. A portion of sample 6 was removed then the remainder was conveyed though at 95 feet per minute to match the carpet back coating line on which the carpet was being run.

For each piece of sheared and unsheared sample selvage, tufts were removed from the primary backing and their lengths measured by manually applying the minimal tension necessary to straighten the tuft then determining the length with a ruler. The percent of face fiber sheared off by the beveling head shearing device was then calculated by dividing the difference between the average unsheared length and the average sheared length by the average unsheared length and multiplying by 100. Each group of tufts was then weighed as a group and then the nylon 66 fibers were dissolved in 2,2,2-trifluoroethanol (TFE). The resultant insoluble residue, which comprises adhesive used to bind tufts to the primary backing, was weighed. The difference between the weights of the unsheared and sheared tufts, each corrected for the weight of the residual adhesive, divided by the unsheared weight, which was corrected for residual adhesive, reflected the fraction of face fiber removed by the shearing device. Multiplying this fraction by 100 yielded the percent of face fiber sheared off. The data from these trials is summarized in Table 3.

TABLE 3

| Sample | Face Weight (ounce per square yard) | Face Fiber Height (in) | Change in Average Length (%) | Change in Weight (%) | Average of Change (%) |
|---|---|---|---|---|---|
| 5 | 25 | 14/32 | 47.8% | 48.5 | 48.2% |
| 6 | 45 | 16/32 | 54.7% | 61.0 | 57.8% |

These data clearly demonstrate the efficacy with which this device can be used to shear off face fiber at speeds equal to that used on industrial carpet manufacturing finishing lines. It is important to note that the face weight of the selvage waste can influence the recovery percentages. For instance, carpets with higher face weights will tend to allow for higher face fiber recovery rates. The recovery percentages can also be influenced by the pattern of the tufts. For instance, more primary backing can be recovered from carpets which have no shift in the tufting pattern of the face fiber than from carpets having a shift in the tufting pattern.

What is claimed is:

1. A process for segregating at least one component of a carpet selvage comprising the steps of:
   a. providing carpet selvage waste from carpet manufacturing comprised of tufts, primary backing, an adhesive and optionally a secondary backing,
   b. identifying face fiber type used in said tufts in said carpet selvage,
   c. removing said identified face fiber from said tufts on said carpet selvage such that said face fiber is essentially free of said primary backing and residual said adhesive and d. segregating said removed face fiber from the remainder of said carpet selvage in a mechanical system which segregates fiber by fiber type to obtain a relatively pure stream of said face fiber.

2. The process according to claim 1 wherein step c comprises using a series of carpet beveling heads to remove said face fiber.

3. The process according to claim 1 wherein at least about 48% said face fiber is removed.

4. The process according to claim 1 wherein as least about 57% said face fiber is removed.

5. The process according to claim 1 wherein said face fiber is nylon 6 or nylon 66.

6. The process according to claim 5 comprising the additional step of feeding said removed and segregated nylon 6 face fiber into a depolymerization reaction.

7. The process according to claim 1 wherein step b said face fiber type is identified by using one of the following: the Carpet Component Identification Code or Near Infrared spectroscopic analysis.

8. The process according to claim 1 wherein step d said mechanical system used to segregate fiber by fiber type comprises a series of pneumatic conveyors with diverter valves.

9. The process according to claim 8 wherein said diverter valves are controlled using information from one of the following: the Carpet Component Identification Code or a spectroscopic analysis computer, in addition to a metal detector.

10. The process according to claim 1 comprising the additional step of operating said process in close temporal and physical relationship to said carpet manufacturing.

11. A process for separating at least two components of a carpet selvage comprising the steps of:
   a. providing carpet selvage waste from carpet manufacturing comprised of tufts, primary backing, an adhesive and optionally a secondary backing,
   b. identifying face fiber type used in said tufts in said carpet selvage,
   c. removing and segregating said secondary backing from said carpet selvage to obtain a relatively pure stream of said secondary backing,
   d. removing said identified face fiber off said primary backing such that said face fiber is essentially free of said primary backing and residual said adhesive,
   e. segregating said removed face fiber in a mechanical system which segregates fiber by fiber type to obtain a relatively pure stream of said face fiber,
   f. removing the edge of said primary backing which does not contain said face fiber, and segregating it to obtain a relatively pure stream of said primary backing,
   g. collecting said relatively pure streams of material in separate bins and,
   h. baling, pelletizing or agglomerating said relatively pure material streams.

12. The process according to claim 11 wherein step h said baled, pelletized or agglomerated relatively pure material streams are provided for sales as recycled resin.

13. The process according to claim 11 wherein step b said face fiber type is identified by using, one of the following: the Carpet Component Identification Code or Near Infrared spectroscopic analysis.

14. The process according to claim 11 wherein step c comprises removing said secondary backing from said carpet selvage using a series of nip rollers.

15. The process according to claim 11 wherein step d comprises removing said face fiber by using one of the following: band knife equipment, a reciprocating shear or a series of carpet beveling heads.

16. The process according to claim 11 wherein step e said mechanical system used to segregate fiber by fiber type comprises a series of pneumatic conveyors with diverter valves.

17. The process according to claim 16 wherein said diverter valves are controlled using information from one of the following: the Carpet Component Identification Code or a spectroscopic analysis computer, in addition to a metal detector.

18. The process according to claim 11 wherein step f comprises removing said edge of said primary backing by using a circular rotary cutting blade, hot wire or hot air.

19. The process according to claim 11 wherein the sum of the segregated relatively pure streams of material comprise at least about 74 weight % of the starting carpet selvage.

20. The process according to claim 11 wherein at least about 31 weight % said face fiber is recovered, at least about 5 weight % said primary backing is recovered, and at least about 36 weight % said secondary backing is recovered.

21. The process according to claim 11 comprising the additional step of operating said process in close temporal and physical relationship to said carpet manufacturing.

22. The process according to claim 11 wherein said face fiber is nylon 6 or nylon 66.

23. The process according to claim 22 comprising the additional step of feeding said removed and segregated nylon 6 face fiber into a depolymerization reaction.

24. An apparatus for removing and segregating fiber from a composite of said fiber and a non-fibrous backing comprising:
   a. a rotating element for transporting said composite,
   b. a series of at least four beveling heads for removing said fiber wherein said beveling heads are in close proximity to said rotating element and each said beveling head comprises a rotating cutting device and a stationary cutting device and
   c. a means for removing and segregating said cut fiber from the remainder of said composite.

25. The apparatus according to claim 24 wherein step c said means for removing and segregating cut fiber comprises vacuum lines.

* * * * *